United States Patent [19]

Shaffer

[11] Patent Number: 4,904,625
[45] Date of Patent: Feb. 27, 1990

[54] REFRACTORY COMPOSITES OF ALUMINA AND BORON NITRIDE

[75] Inventor: Gregory W. Shaffer, Brunswick, Ohio

[73] Assignee: Union Carbide Corporation, Danbury, Conn.

[21] Appl. No.: 914,931

[22] Filed: Oct. 3, 1986

[51] Int. Cl.$^4$ .................... C04B 35/58; C04B 35/10
[52] U.S. Cl. ........................ 501/98; 501/96; 501/127
[58] Field of Search ............... 501/96, 127, 98

[56] References Cited

U.S. PATENT DOCUMENTS

| | | | |
|---|---|---|---|
| B 750,679 | 3/1976 | Rossi et al. | 106/58 |
| 2,745,763 | 5/1956 | Veltz | 501/98 |
| 4,007,049 | 2/1977 | Rossi et al. | 106/58 |
| 4,304,870 | 12/1981 | Rice et al. | 501/98 |
| 4,304,879 | 12/1981 | Rice et al. | 501/98 |
| 4,389,465 | 6/1983 | Nakai et al. | 501/98 |

FOREIGN PATENT DOCUMENTS

| | | | |
|---|---|---|---|
| 150092 | 7/1985 | European Pat. Off. | 501/96 |
| 45-30102 | 9/1970 | Japan | 501/96 |
| 49-48446 | 12/1974 | Japan | 501/96 |
| 55-104977 | 8/1980 | Japan | 501/96 |
| 57-38379 | 3/1982 | Japan | 501/96 |
| 58-60679 | 4/1983 | Japan | 501/96 |
| 58-176173 | 10/1983 | Japan | 501/96 |
| 59-86679 | 1/1984 | Japan | 501/96 |
| 59-169982 | 9/1984 | Japan | 501/96 |
| 441255 | 8/1974 | U.S.S.R. | 501/96 |
| 629197 | 9/1978 | U.S.S.R. | 501/96 |
| 784704 | 10/1957 | United Kingdom | 501/96 |

OTHER PUBLICATIONS

R. W. Rice et al., "Thermal Structure Ceramic Composites", Ceram., eng. sci. proc., 1:424–43 (Nos. 7–8, 1980);

D. Lewis et al., "Microstructure and Termomechanical Properties in Alumina-and Mullite-Boron-Nitride Particulate Ceramic Ceramic Composites", Ceram. eng. sci. proc., 2:179–727 (Nos. 7–8, 1981).

D. Goeuriot-Launay et al. "Boron Nitride Effect on the Thermal Shock Resistance of an Alumina-based Ceramic Composite".

*Primary Examiner*—William R. Dixon, Jr.
*Attorney, Agent, or Firm*—Eugene Lieberstein

[57] ABSTRACT

Composites of alumina and boron nitride having superior thermal shock resistance, and particularly suitable for use in hot metal applications such as break rings in horizontal continuous casters.

9 Claims, No Drawings

REFRACTORY COMPOSITES OF ALUMINA AND BORON NITRIDE

FIELD OF THE INVENTION

The present invention relates to ceramic composites comprising alumina and boron nitride, which are useful in molten metal applications.

BACKGROUND OF THE INVENTION

Ceramic materials are currently being used successfully in a variety of molten metal applications. These applications usually involve extreme environmental conditions such as rapid rises in temperature, and severe temperature gradients. A particularly demanding application is in breakrings in horizontal continuous casters. Breakrings are commonly subjected to extremely fast temperature rises, and high temperature gradients often in excess of 1000° C./cm. These conditions require a material that has good thermal shock resistance to prevent breaking. Additionally the material should preferably have a high abrasion resistance and corrosion resistance with respect to molten metals, be machinable, and be economical to manufacture.

Boron nitride is successfully used as a material for breakrings due to its good thermal shock resistance, corrosion resistance, stability at high temperature, and machinability. However, it lacks good abrasion resistance, which renders it subject to high wear rates when exposed to flowing metal. Additionally, BN ceramics typically contain a $B_2O_3$ binder phase that can react chemically with molten metals, which further degrades the integrity of the boron nitride ceramic. The degradation of the BN can also cause problems with the metal being cast. BN particles, as well as bubbles which form from gaseous $B_2O_3$ or $CO_2$ from the reaction of $B_2O_3$ with carbon, can be trapped in the metal as it solidifies.

Alumina is also used in molten metal applications due to its hardness, abrasion resistance, and chemical stability. Although satisfactory, alumina ceramics often have poor thermal shock properties, and are difficult to machine because of their hardness.

It would be desirable to provide a refractory material which has the abrasion resistance, and chemical stability of $Al_2O_3$, but also has the thermal shock resistance, and good machinability of BN.

Rice et al. in "Thermal Structural Ceramic Composites" in Cer. Eng. Sci. Proc., 1:424-43, (Nos. 7-8,1980) disclose an alumina-boron nitride composite for dielectric applications. A fine agglomerate free BN is preferred as the source of boron nitride. The alumina and boron nitride were milled, and processed at a temperature greater than 1800° C. Processing temperatures less than or equal to 1700° C. are described as not suitable. The resulting composites had Young's Moduli between 193.05 and 199.95 MPa. (28 and 29 psi$\times 10^6$)

Lewis et al. in "Microstructure and Thermomechanical Properties in Alumina- and Mullite-Boron-Nitride Particulate Ceramic-Ceramic Composites", Cer. Eng. Sci. Proc., 2:719-27, (Nos. 7-8,1981) disclose alumina/boron nitride composites made by wet milling fine boron nitride and alumina particulate materials for 16-40 hours in an alcohol, and hot pressing in air or vacuum conditions. The composites disclosed by Lewis et al. had densities from 94.5 to 96.5 % of the theoretical density, parallel Young's Moduli between 103 and 77 GPa ($11\times 10^6$ and $17\times 10^6$ psi), a parallel CTE of $20\times 10^{-6}$ 1/° C., and a perpendicular CTE of $7\times 10^{-6}$ 1/° C.

SUMMARY OF THE INVENTION

An aspect of the invention is a composite produced by heating and compressing a mixture of particulate alumina and boron nitride, which consists essentially of between about 50 and about 90 weight percent alumina, and between about 10 to about 50 weight percent boron nitride, said composite having a density of not more than 93%, preferably between about 73% and about 93%, more preferably between 83% and 93%, of the theoretical density, a coefficient of thermal expansion (CTE) measured on samples cut in the direction parallel to the direction of compression of the composite of greater than 0 and not more than about $15\times 10^{-6}$ 1/° C., and a Young's modulus measured on samples cut in the direction parallel to the direction of compression of the composite of greater than 0 and not more than about $11\times 10^6$ psi (76 GPa), preferably between about $5\times 10^6$ and about $9\times 10^6$ psi (34 to 62 GPa).

Another aspect of the invention is a method for manufacturing an alumina, boron nitride composite which comprises;

(a) providing a mixture consisting essentially of between about 50 to 90 weight percent particulate alumina, and between 10 to 50 weight percent particulate boron nitride;

(b) dry blending the mixture;

(c) heating and compressing the mixture in a mold between about 1600 and about 1800° C. molding temperature, and between about 1800 and about 2500 psi (12.4-17.2 Mpa) molding pressure, under non-oxidizing atmospheric conditions for a period of time sufficient to stabilize the density of the compressed mixture to form a ceramic composite, (d) cooling the composite; and (e) recovering the composite from the mold.

The alumina preferably has a purity not less than about 99.9 weight percent, more preferably 99.99 weight percent. The boron nitride preferably has a purity not less than about 99 weight percent, more preferably not less than 99.5 weight percent.

The composite of the invention, while it may be used in any suitable application, is particularly suitable in hot metal applications. More particularly, it is suitable in hot metal applications requiring high thermal shock resistance, such as break rings used in continuous casters. As mentioned above, break rings are often subjected to rapid rises temperature from room temperature to several thousand degrees. Additionally the temperature gradients through the break rings are very high, often higher than 1000° C./cm.

The properties of the composite of the invention in this application are equal to, and in most cases better than, those of hot-pressed boron nitride ceramics, which are currently being used in these applications. The advantages of the boron nitride/alumina composites of the invention over boron nitride ceramics include;

1. Improved abrasion resistance as shown by a higher Rockwell hardness;

2. Lower $B_2O_3$ and/or volatile impurity content;

3. Equivalent or improved thermal shock resistance as shown by a Young's modulus equal to or lower than BN;

4. Improved high temperature flexural strength;

5. Improved corrosion resistance with respect to molten metal;

6. Potentially lower cost that boron nitride ceramics, due to less expensive raw material requirements, and lower processing temperatures during manufacture;

7. Improved metal product quality when composite is used due to lower attrition into and reaction with the molten metal; and 8. Longer service life.

DESCRIPTION OF THE INVENTION

The composite of the invention is of the class of ceramic composites which are produced by "hot pressing", that is by heating and compressing particulate materials, i.e. particulate alumina and boron nitride. The composite of the invention consists essentially of between about 50 and about 90 weight percent alumina, and between about 10 to about 50 weight percent boron nitride. The composite may contain, in addition to alumina and boron nitride, minor contaminants, principally reaction products of alumina and boron nitride, and to a lesser extent, adulterants in the raw materials. The principal alumina boron nitride reaction product to contaminate the composites of the invention is $B_2O_3$, with a lesser amount of AlN. An advantage of the composite of the present invention, is that the $B_2O_3$ content is typically less than that of boron nitride ceramics, which typically contain 3 to 9 weight percent $B_2O_3$. Preferably the composite of the invention contains less than about 3 weight percent $B_2O_3$, more preferably less than 1 weight percent $B_2O_3$.

The composites of the invention are further characterized as having a superior thermal shock resistance. This demonstrated by the low coefficient of thermal expansion (CTE) and a low Young's Modulus. The composites of the invention have a CTE measured on sample bars cut in the direction parallel to the direction of compression of the composite of not more than about $15 \times 10^{-6}$ 1/° C., and a Young's modulus measured on bar cut in the direction parallel to the direction of compression of the composite of not more than about $11 \times 10^6$ psi (76 GPa). Preferably the Young's Modulus (parallel) is between about $5 \times 10^6$ psi and about $9 \times 10^6$ psi (34.5–62.1 GPa). The density is between about 73% and about 93%, preferably between about 83% and about 93%, of the theoretical density. The lower density also contributes to a lower Young's Modulus and a higher thermal shock resistance, and because it provides higher porosity it inhibits crack propagation. A lower density also aids in the machinability since a higher density often indicates an excessively hard, difficult to machine material. Through the combination of lower density, CTE, and Young's modulus, the composites of the invention exhibit suprisingly good thermal shock resistance, resistance to cracking, and machinability.

For reasons of machinability, the preferred composites of the invention have a hardness between about 110 and about 130, more preferably between about 115 and 120, as measured on the Rockwell R scale.

The preferred composites of the invention also have a high resistance to abrasion by hot metals, as reflected in part by the high hot temperature strength, which is superior to that of BN ceramics. Accordingly, the flexural strength at 1500° C. of the preferred composites of the invention on sample bars cut in the direction parallel to the direction of compression of the composite is not less than 3500 psi (24 MPa), preferably not less than 5500 psi (38 MPa). Generally the flexural strength at 1500° C. on parallel cut samples is not more than 11000 psi (76 Mpa).

When the composite is manufactured by a uniaxial compression method, the CTE, Young's modulus, and 1500° C. flexural strength are measured sample bars cut parallel to the axis of compression. The values measured on bars cut perpendicular to the axis of compression may deviate from the ranges reacted in the claims. However, in such a case, such composites are within the contemplation of the invention, if the ranges measured on parallel cut bars are within the ranges claimed.

When the composite is manufactured by an isostatic compression method, there is no one direction of compression, and the composite will be isotropic. For isostatically compressed composites, the CTE, Young's modulus, and flexural strength can be measured on bars cut in any direction.

The present invention involves a method for the manufacture of alumina, boron nitride composites of the invention. In the method of the invention a mixture is provided consisting essentially of between about 50 to 90 weight percent particulate alumina and between about 10 to 50 weight percent particulate boron nitride. The alumina and boron nitride are substantially pure materials. The purity of the alumina should preferably be not less than about 99.9, more preferably not less than than 99.99 weight percent $Al_2O_3$. The purity of the boron nitride should should preferably be not less than about 99 weight percent, more preferably not less than 99.5 weight percent BN. The purity refers mainly to the absence of impurities which form liquids or react to form liquids at the processing temperature, the principle impurities usually being $B_2O_3$, and iron. These impurities in the $Al_2O_3$ and/or BN can form a glassy grain boundary phase during firing. This generally results in a product with a higher density and a higher CTE than the composite of the invention. Non-liquid forming impurities may be present in larger amounts, and the composite will still be within contemplation of the invention.

The mixture is prepared by dry blending. By "dry blending" is meant solid-solid mixing in the dry state wherein the particles are mixed mainly by creating a new surface of the particulate material and distributing particles over the freshly developed surface, as for example by mixing in a plain tumbler. The mixing should be gentle, but should substantially disperse the alumina and boron nitride particles. Additionally, the large agglomerates should be broken up. However, it is not necessary to completely break up all particle agglomerations or avoid formation of small agglomerations of the $Al_2O_3$ and BN particles. It is undesirable to finely grind or divide the alumina and boron nitride, since this will result in a final composite which has an undesirably high density.

Suitable mixers are the various tumblers, such as double cone blenders, twin shell or v-blenders, drum blenders, and the like. Mixing aids such as baffles, intensifier bars, and other impact devises in the tumbler may be used to break down large agglomerates of particles as long as these devises to not cause excessive attrition of the particles themselves. Mixing devices which rely mainly on shear or compressive forces, or grinding action to mix the materials, as for example mullers, and ball and rod mills, are generally not suitable. These types of mixers result in an excessive particle size reduction, which results in an undesirably high density. Likewise, wet milling, which is commonly used in ceramic production, results in a more homogeneous mixture with a finer particle size than that resulting from the dry blending or the invention. The wet-milled mixture, therefore, results in an undesirably high final density. The dry blending in the present method, in contrast to wet blending, allows possible agglomerates of the $Al_2O_3$ and BN particles, which allow a lower density composite to be formed.

After the alumina and boron nitride are mixed, the mixture is heated in a mold to form a ceramic material. The method for heating and compressing may be by conventional hot pressing methods used for manufacturing ceramics The compression may be uniaxial compression, or isostatic compression. The molding temperature should be between about 1600 and about 1800° C., and the molding pressure between about 1800 and about 2500 psi (12.4–17.2 MPa). Too high of a processing temperature (greater than 1800° C.) causes excessive reaction of BN and $Al_2O_3$, forming a $B_2O_3$ phase. The $B_2O_3$ phase liquefies at the processing temperatures and results in densification of the composite. Likewise, the use of pressures higher than those recited will result in a higher density composite. Lower temperatures or pressures than those recited may result in a composite that is not fully bonded.

The compression and heating are carried out simultaneously in a non-oxidizing atmosphere with respect to alumina and boron nitride. A suitable non-oxidizing atmosphere may be provided by a vacuum, or an atmosphere of a non-oxidizing gas such as a noble gas (i.e. argon), ammonia, or nitrogen. In an oxidizing atmosphere, such as air, the BN can oxidize to form a $B_2O_3$ phase, which is in a liquid phase during firing, allowing the particles to pack more densely.

During compression and heating of the mixture, the particulate mixture will increase in density and form a bonded composite. After sufficient time of compression and heating at the above temperature and pressure, the increase of density will essentially stop. After the density has stabilized the particles are sufficiently bonded, the pressure may be released and the resulting bonded ceramic composite of alumina and boron nitride cooled and released from the mold.

EXAMPLES

The following examples are intended to illustrate the invention, and are not intended to limit the scope of the present invention in any manner.

Example I

Composites of the invention may be made as follows by the method of the invention. Alumina (99.99 wt. % pure $Al_2O_3$, surface area between 5 and 20 $m^2/g$, particle size between 0.3 and 0.8 microns) is mixed with boron nitride (BN), which has been temperature purified to 1900° C. to less than 0.2 wt. % $B_2O_3$, with less than 0.5 wt. % lattice oxygen (measured as $O_2$). The BN has a surface area between 10 and 15 $m^2/g$, and at least 94.5 wt. % has a −325 mesh particle size (less than 44 microns). The alumina is a commodity item and is readily available. A suitable boron nitride is Grade HCP from Union Carbide Corporation, Danbury, Connecticut.

The powders are mixed in a v-blender with an intensifier bar for 60 minutes.

The powder is then introduced into a conventional hot press apparatus for making particulate ceramics, with a graphite mold and uniaxially pressed to a pressure of 2200 psi (15 MPa), and heated to between 1700 and 1750° C.

The rates of pressure and temperature increases, and the hold time are dependent upon the size of the sample. The pressure and temperature are maintained until density of the mixture in the mold stabilizes.

EXAMPLE II 350.0 grams $Al_2O_3$ (75 weight percent) and 116.7 grams BN (25 weight percent), were mixed for one hour with a twin shell V-blender with an intensifier bar. The $Al_2O_3$ was from Union Carbide Corporation, and was 99.99% pure, had a surface area of 17.4 $m^2/g$, and had an average particle size of 0.5 microns. The BN was Union Carbide Grade HCP and contained less than 0.5% lattice $O_2$, had a purity of greater than 99.0%, had a particle size such that 94.5 wt. % was less than −325 mesh (44 microns), and had a surface area of approximately 10 to 15 $m^2/g$. Union Carbide HCP Grade BN is fabricated by rapidly heating an impure grade of BN, with a high $B_2O_3$ content and lattice $O_2$ content, to 1900° C. and holding there until substantially all of the $B_2O_3$ has vaporized and most of the lattice oxygen has been removed.

The blended material (275.0 grams) was then pre-pressed into a fine-grain graphite mold (Union Carbide Corporation Grade ATJ). This size of the mold was; inside diameter - 2 inches (5 cm), outside diameter - 3¾ inches (9.5 cm), and length-181/16 inches (45.9 cm).

The mold and contents were loaded into a 4 inch (10 cm) diameter resistance heated tube furnace, and heated and uniaxially compressed with a hydraulic ram to 1700° C. and 2500 psi (17.2 MPa) in a nitrogen atmosphere, and held at that temperature and pressure for two hours. The heating and pressurizing rates were respectively 600° C./hr and 800 psi/hr (5.5 MPa/hr). The mold was allowed to cool, and the billet was removed from the mold.

Samples bars were then cut from the billet parallel to the pressing direction, and properties of the composite measured. The process conditions and properties are summarized below as Sample I-1 in Tables A, B, C, and D. Table D shows some of the same data shown and Tables A, B, and C, in SI units. The density, Young's modulus, room-temperature flexural strength, 1500° C. flexural strength, and Rockwell R hardness were measured on bars 5/16×5/16 inches (0.8×0.8 cm), X length of the billet. The CTE was measured using bars about 5/16×5/16 inches (0.8×0.8 cm) and about 2½ inches long (63.5 cm).

The CTE was measured by placing the sample bar on support pins and inserting lengthwise into a graphite tube furnace. An optical extensometer was used which comprised two parallel telescopic sights mounted so that the distance between the axis of the sights could be adjusted A caliper was used to measure the distance between the sights The sights were focused on the ends of the sample bar through sight tubes in the furnace. The furnace was heated under an inert atmosphere, and at appropriate temperature intervals the length of the sample was measured with the caliper The CTE was calculated as the fractional change of the length of the sample divided by the rise in temperature in degrees centigrade.

The flexural strengths, at 1500° C., and at room temperature, were determined using the ASTM D-690 three point loading method.

The $B_2O_3$ content was measured on ground up room-temperature flexural strength bars, by extracting the $B_2O_3$ with methanol, and measuring the boron content of the methanol by Nuclear Magnetic Resonance.

Example III

Composites were made similar to that described above in Example II, except the composition and process conditions were varied. The process conditions and properties are shown below in Tables A, B, C, and D below, as samples I-2 to I-10. The alumina used was the same or similar to that used in Example II. The surface area of the alumina for Samples I-1, I-3, and I-6 was 17.42 m²/g; for I-2, I-4, I-8, and I-9, 8.95 m²/g; and for I-5, and I-7 16.07 m²/g. The purity of the alumina was about 99.99 weight percent $Al_2O_3$. The BN was the same used in Example II. All samples were pressed at a pressure between 2200 and 2500 psi (15.2–17.2 MPa).

For purposes of comparison, average properties of a BN refractory ceramic are also included in tables A, B, C, and D, as Sample C-1.

Tests were also conducted to determine if the composite of the invention is wetted by molten metals. Tests were run using molten iron, nickel, and stainless steel. No wetting of the composite was observed. This indicates that the porosity of the composites due to the lower density does not lead to infiltration of the metal into the composite structure, since the composite is not wetted. It was further observed that the composites of the invention are not significantly abraded in the presence of molten metal. This is due to the high 1500° C. flexural strength, and hardness. This contrasts with BN ceramics currently used (see C-1) which have much lower 1500° C. flexural strength and hardness, and hence lower abrasion resistance with respect to molten metals.

Comparative Example I

An alumina/boron nitride composite was produced substantially as in Example II, except an alumina was used that was less than 99.9 weight percent $Al_2O_3$. The alumina had a particle size less than 325 mesh (44 microns), a surface area of 2.06 m², and purity of 99.5 weight percent, and possessed a tabular or platelet crystal morphology. The process conditions and properties are shown in Tables A, B, C, and D as Sample C-2. This composite showed superior thermal shock properties by the low CTE and Young's modulus data, but would not be preferred because it had low flexural strength at 1500° C.

Comparative Example II

An alumina/boron nitride composite was produced substantially as in Example II, except the mixture of alumina and boron nitride was wet milled with methanol in a ball mill, rather than dry blended as the composites of the invention. The process conditions and properties of this composite are shown in Tables A, B, C, and D, as Sample C-3.

By comparison of the data, it can be seen that wet-milling has produced a composite which is significantly denser, with a comparatively poor Young's modulus. This composite would not have the superior thermal shock properties of the composites of the invention. Furthermore, the 1500° C. flexural strength is significantly inferior. This composite would not, therefore, have the superior hot metal abrasion resistance of the composites of the invention.

TABLE A

Composite Composition And Process Conditions

| Sample | $Al_2O_3$ (wt. %) | BN (wt. %) | Processing Temperature (°C.) | Billet Size (in) |
|---|---|---|---|---|
| I-1 | 75 | 25 | 1700 | 2 |
| I-2 | 75 | 25 | 1700 | 2 |
| I-3 | 75 | 25 | 1800 | 2 |
| I-4 | 75 | 25 | 1800 | 2 |
| I-5 | 75 | 25 | 1800 | 2 |
| I-6 | 65 | 35 | 1700 | 2 |
| I-7 | 75 | 25 | 1800 | 6 |
| I-8 | 70 | 30 | 1700 | 6 |
| I-9 | 75 | 25 | 1800 | 6 |
| I-10 | 75 | 25 | 1800 | 6 |
| C-1 | 0 | 100 | — | 14 |
| C-2 | 75 | 25 | 1700 | 2 |
| C-3 | 75 | 25 | 1800 | 2 |

TABLE B

Composite Properties

| Sample | Percent Theoretical Density (%) | CTE × 10⁻⁶ (1/°C.) | Young's Modulus × 10⁶ (psi) | Rockwell Hardness (R-Scale) |
|---|---|---|---|---|
| I-1 | 86.5 | 7.66 | 8.2 | 127.0 |
| I-2 | 84.1 | 7.69 | 6.3 | 124.7 |
| I-3 | 88.4 | 8.25 | 9.8 | 124.8 |
| I-4 | 89.4 | 7.75 | 8.7 | 125.9 |
| I-5 | 91.0 | 7.86 | 9.3 | 127.0 |
| I-6 | 73.6 | 8.45 | 3.6 | 112.7 |
| I-7 | 92.0 | 9.79 | 10.8 | 122.7 |
| I-8 | 83.8 | 14. | 5.94 | 118.3 |
| I-9 | 87.8 | 9.18 | 8.93 | 126.1 |
| I-10 | 90.9 | 11.2 | 10.9 | 124.9 |
| C-1 | 89.0 | 2.70 | 11.3 | 114.2 |
| C-2 | 90.0 | 0.65 | 9.2 | 120.0 |
| C-3 | 97.2 | 7.8 | 13.34 | 128.0 |

TABLE C

Composite Properties

| Sample | Weight Percent $B_2O_3$ (%) | 1500° C. Flexural Strength (psi) | Room Temp. Flexural Strength (psi) | Dielectric Constant | Loss Tangent |
|---|---|---|---|---|---|
| I-1 | 0.61 | 7325 | 8682 | 5.80 | 0.0046 |
| I-2 | 1.68 | 4606 | 4043 | — | — |
| I-3 | — | 7612 | 5944 | 6.32 | 0.0056 |
| I-4 | 2.08 | 4712 | 7249 | — | — |
| I-5 | 2.45 | 4326 | 5594 | — | — |
| I-6 | — | 3685 | 3832 | — | — |
| I-7 | 1.53 | 5134 | 9755 | — | — |
| I-8 | — | 5645 | 6030 | — | — |
| I-9 | 1.41 | 8007 | 8510 | — | — |
| I-10 | 0.86 | 6222 | 6464 | — | — |
| C-1 | 3–9 | 2143 | 14000 | 5.12 | 0.0015 |
| C-2 | 0.73 | 1850 | 7850 | — | — |
| C-3 | 2.90 | 2117 | 13097 | — | — |

TABLE D

Selected Composite Properties In SI Units

| Sample | Billet Size (cm) | Young's Modulus (GPa) | Room Temp. Flexural Strength (Mpa) | 1500° C. Flexural Strength (Mpa) |
|---|---|---|---|---|
| I-1 | 5.1 | 56.5 | 59.9 | 50.5 |
| I-2 | 5.1 | 43.4 | 27.9 | 31.8 |
| I-3 | 5.1 | 67.6 | 41.0 | 52.5 |
| I-4 | 5.1 | 60.0 | 50.0 | 32.5 |
| I-5 | 5.1 | 64.1 | 38.6 | 29.8 |
| I-6 | 5.1 | 24.8 | 26.4 | 25.4 |
| I-7 | 5.1 | 74.5 | 67.3 | 35.4 |

TABLE D-continued

Selected Composite Properties In SI Units

| Sample | Billet Size (cm) | Young's Modulus (GPa) | Room Temp. Flexural Strength (Mpa) | 1500° C. Flexural Strength (Mpa) |
| --- | --- | --- | --- | --- |
| I-8 | 15.2 | 41.0 | 41.6 | 38.9 |
| I-9 | 15.2 | 61.6 | 58.7 | 55.2 |
| I-10 | 15.2 | 75.2 | 44.6 | 42.9 |
| C-1 | 35.6 | 77.9 | 96.5 | 14.8 |
| C-2 | 5.1 | 63.4 | 54.1 | 12.8 |
| C-3 | 5.1 | 92.0 | 90.3 | 14.6 |

The above data show the superiority of the composites of the invention as compared with prior art alumina/boron nitride composites. With respect to the composites discussed above of Rice et al. and Lewis et al., the composites of the invention demonstrate better qualities for molten metal applications. The composites of the invention possess a lower density, a lower Young's modulus, and and a lower coefficient of thermal expansion. These data for CTE and Youngs's Modulus indicate a significantly better thermal shock resistance in the composites of the invention than the prior art composites. Thermal shock resistance is probably the most important property for molten metal applications, such as for break rings. The lower density of the composites of the invention also contribute to the low Young's modulus of the composite. In addition, the lower density indicates porosity and the presence of low density particles (agglomerates), which act as crack stoppers when the composite is stressed.

While this invention has been described with reference to certain specific embodiments and examples, it will be recognized by those skilled in the art that many variations are possible without departing from the scope and spirit of the invention, and that the invention, as described by the claims, is intended to cover all changes and modifications of the invention which do not depart from the spirit of the invention.

What is claimed is:

1. A composite produced by heating and compressing a mixture of particulate alumina and boron nitride, which composite consists essentially of between about 50 and about 90 weight percent alumina having a purity of at least 99.90 weight percent, and between about 10 to about 50 weight percent boron nitride having a purity of at least 99 weight percent, said composite having a density not more than about 93% of the theoretical density, and a Rockwell R hardness less than 130.

2. The composite of claim 1 having a flexural strength measured on samples cut in the direction parallel to the direction of compression of the composite at 1500° C. of not less than 3500 psi.

3. The composite of claim 2, wherein the flexural strength at 1500° C. measured on samples cut in the direction parallel to the direction of compression of the composite is between about 5500 psi and about 11000 psi.

4. The composite of claim 1, wherein the composite contains not more than 3 weight percent $B_2O_3$.

5. The composite of claim 1, wherein the composite contains not more than 1 weight percent $B_2O_3$.

6. The composite of claim 1 wherein the alumina has a purity not less than about 99.99 weight percent.

7. The composite of claim 1 wherein the boron nitride has a purity not less than about 99.5 weight percent.

8. The composite of claim 1 wherein the Rockwell R hardness is between 110 and 130.

9. The composite of claim 1 wherein the Rockwell R hardness is between 115 and 120.

* * * * *

UNITED STATES PATENT AND TRADEMARK OFFICE
CERTIFICATE OF CORRECTION

PATENT NO. : 4,904,625

DATED : February 27, 1990

INVENTOR(S) : G. W. Shaffer

It is certified that error appears in the above-identified patent and that said Letters Patent is hereby corrected as shown below:

Column 6, line 29, delete "length-181/16" and substitute therefor --length - 18 1/16--.

Signed and Sealed this

Tenth Day of September, 1991

Attest:

HARRY F. MANBECK, JR.

Attesting Officer

Commissioner of Patents and Trademarks